July 2, 1940.   P. FIDELMAN   2,206,722
COLORING MATERIAL AND METHOD OF APPLYING SAME
Filed Sept. 25, 1939
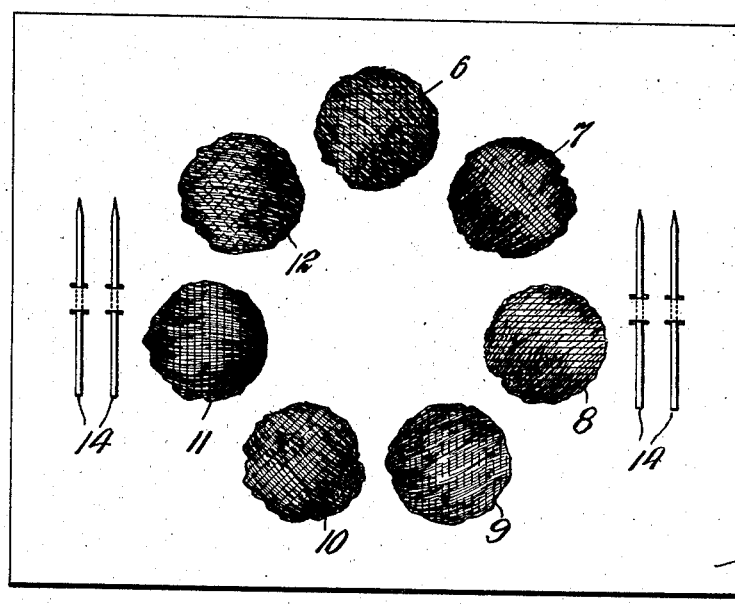
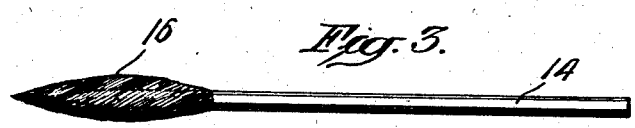
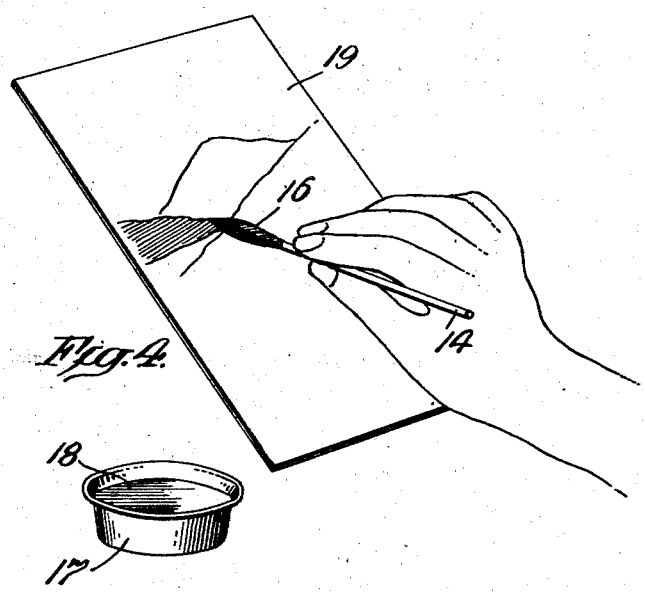
INVENTOR
Paul Fidelman
BY
English and Studwell
ATTORNEYS Patented July 2, 1940

2,206,722

UNITED STATES PATENT OFFICE 2,206,722

COLORING MATERIAL AND METHOD OF APPLYING SAME

Paul Fidelman, New York, N. Y., assignor to Joseph Dixon Crucible Company, Jersey City, N. J., a corporation of New Jersey Application September 25, 1939, Serial No. 296,418

1 Claim. (Cl. 8—79)

The invention relates to an improvement in coloring materials and to a novel method of applying the same to surfaces to be colored. The invention has special application to the coloring of photographs, printed pictures, drawings and the like, with water soluble dyes, as, for example, aniline dyes.

One object of the invention is the provision of coloring material in such form that portions thereof may be readily removed therefrom for specific application to the surface to be colored. The coloring substance is preferably contained in a mass or wad of fibrous absorbent material, such as cotton, wool or the like, impregnated with a water soluble dye, the fibers of the mass being in substantially parallel, slightly twisted (as in a slubber) or haphazard arrangement, as distinguished from fibers twisted into thread form and woven fabrics. The mass of material is preferably mounted on a support so that any desired quantity for the purpose at hand may be removed from the mass of material, leaving the remainder of the mass mounted on the support for further use.

A further object of the invention is the novel method of applying the coloring substance to the surfaces to be colored, as by removing a portion of the mass of dye-impregnated material and using it as a mop or dab or mounting it upon a support, such as a pointed stick, either loosely or twisting it to the desired shape for the purpose in view, moistening the material to bring the dye into liquid form, and then applying the moistened material to the surface to be colored.

In the accompanying drawing, Fig. 1 is a top plan view of a support in the form of a cardboard on which are mounted various masses or wads of the dye-impregnated fibrous material, together with a plurality of pointed sticks for holding the dye-impregnated material while in use; Fig. 2 is a side elevation, on an enlarged scale, of a pointed stick together with a portion of the dye-impregnated fibrous material, previous to twisting it about the pointed end of the stick; Fig. 3 is a side elevation of the portion of fibrous material twisted about the pointed end of the stick and in condition for moistening and application to the surface to be colored; and Fig. 4 is a perspective view indicating the application of the coloring substance to the surface to be colored, by means of the implement shown in Fig. 3, together with a dish for containing water.

The material acting as the carrying medium for the water soluble dye, such as aniline dye, may be either cotton, wool or synthetic materials having liquid absorbent characteristics. Cotton fibers have proved satisfactory in use, since they are cheap and are highly absorbent. Masses of the cotton fibers in a light or fluffy state and in substantially parallel, slightly twisted or haphazard arrangement are dipped into the dye-containing liquid, composed of the dye stuff and water in the desired proportions. After complete saturation, the fibrous material is removed from the bath and the excess liquid is squeezed from the saturated mass. The wet or moist dye-impregnated material is then placed in a centrifuge and spun until substantially all the moisture is extracted from the mass of material, which is then hung on racks for the final drying step. When thoroughly dry, the mass of material resumes its original state of fluffiness and is in such condition that small portions thereof may be removed from the mass for use. Masses or wads of the dry, dye-impregnated fibrous material in convenient sizes may be mounted on a wooden board or a cardboard, or other suitable support, in any appropriate manner, as by providing the board with a series of holes and pushing therein a portion of the mass of fibrous material to prevent it from being accidentally displaced from the board. Or the wads of dye-impregnated fibrous material may be secured to the supporting board by paste or by other fastening means, so that the greater portion of the wads will be in position for the convenient removal therefrom of portions in quantity suitable for the purpose in view. The supporting board may contain any preferred number of wads of the dye-impregnated fibrous material, and the wads may be all of different colors or shades thereof.

The supporting board 5 shown in Fig. 1 is provided with seven masses or wads of the dye-impregnated fibrous material, each of which is of a different color, the wad of material indicated at 6 being yellow or gold colored, and those indicated by the reference numerals 7, 8, 9, 10, 11 and 12 being colored green, blue, violet or purple, brown, red or pink, and orange, respectively. On the supporting card 5 are also mounted a plurality of pointed sticks 14 which may conveniently be composed of wood, for supporting dabs of moistened dye-impregnated fibrous material during application to the surfaces to be colored.

One modification of the novel method of coloring photographs, printed pictures, drawings and the like by means of the water soluble dye-impregnated masses or wads of fibrous material mounted on card 5, is illustrated in Figs. 2, 3 and 4. A portion of one of the masses or wads of colored material is torn from the mass, as indicated at 15 in Fig. 2, and may be of any preferred size, depending upon the nature of the work to be accomplished. The detached portion 15 of the dye-impregnated material is mounted on the pointed end of a stick 14. If a relatively large surface is to be covered by a wash of the coloring substance, the detached portion 15 of the material is mounted loosely on the pointed end of the stick and moistened with water so that the dye is brought into sufficiently liquid condition for application to the surface. If, however, relatively fine work is to be done, as for example, that comparable to the work performed by camel's hair brushes or pencils or crayons, then the detached portion of the fibrous material is twisted around the pointed end of the stick into a tapered wad, as indicated at 16 in Figs. 3 and 4. The portion 15 of the fibrous material is preferably twisted around the pointed end of the stick 14 while it is in dry condition and brought to the requisite shape and size before it is moistened to bring the dye into liquid form for application to the surface to be colored. The moistening of the fibrous material may be effected in any convenient way, as by dipping it into a pan 17 of water 18. The moistened dye-impregnated fibrous material is now in condition for application to the photograph or other surface to be colored, one such photograph or printed surface being indicated at 19 in Fig. 4.

In the application of the moistened colored material to the surface to be colored, a relatively large wad of the material will be used with a sponging effect, and when relatively fine lines are to be made the pointed wad will be used somewhat in the manner of a fine brush or a crayon. In those cases where relatively large areas are to be covered by a single color at a time, it is not necessary to support the dab of moistened dye-impregnated fibrous material upon a stick. The desired amount of material may be detached from one of the wads mounted on the supporting board and a portion of it held between the ends of the fingers of one hand. The unheld portion may then be dipped into water to bring the dye into liquid condition, after which the moistened dab may be applied to the surface to be colored as a mop or sponge. The amount of liquid dye or other coloring substance to be applied to the surface to be colored can be readily regulated by the pressure exerted upon the moistened fibrous material, the material itself being sufficiently absorbent to retain within its mass the liquid not applied to the surface to be colored. By reason of this property, it will be recognized that the present invention provides convenient means and method of spreading any desired thickness of coloring substance upon a photograph, printed picture, drawing or the like, either as a wash or as relatively fine lines.

From the foregoing description, it will be understood that the invention consists in the provision of a relatively large mass of dye-impregnated absorbent fibrous material, the fibers of which are not twisted into thread form or woven into fabric, but adhere to each other loosely by reason of their fibrous nature, so that portions may be detached by pulling them from the main body of the mass of material for use either with or without a supporting stick, after having been moistened to bring the dye into condition to give up its color to the surface to be colored.

Having thus described the invention, what I claim as new is:

As an article of manufacture, a carrier member, a plurality of colored wads of dry, absorbent fibrous material impregnated with a water soluble dye attached to said carrier member, and the fibers of the individual wads adhering to each other by reason of their fibrous nature only whereby portions of the desired size may be selectively detached from the wads for attachment to an implement and used for coloring photographs, printed pictures, drawings and the like with the water soluble dye with which said fibers are impregnated.

PAUL FIDELMAN.